United States Patent
Xie et al.

(10) Patent No.: US 10,202,692 B2
(45) Date of Patent: Feb. 12, 2019

(54) COPPER-CLAD ALUMINUM COMPOSITE WIRE

(71) Applicant: JIANGSU GREENSHINE WIRE AND CABLE CO., LTD., Zhangjiagang, Jiangsu (CN)

(72) Inventors: Guofeng Xie, Jiangsu (CN); Xiaowen Xie, Jiangsu (CN)

(73) Assignee: JIANGSU GREENSHINE WIRE & CABLE CO., LTD., Jiangsu (CN)

( * ) Notice: Subject to any disclaimer, the term of this patent is extended or adjusted under 35 U.S.C. 154(b) by 246 days.

(21) Appl. No.: 15/206,564

(22) Filed: Jul. 11, 2016

(65) Prior Publication Data

US 2016/0322130 A1    Nov. 3, 2016

(30) Foreign Application Priority Data

May 16, 2016 (CN) .......................... 2016 1 0321527

(51) Int. Cl.

| H01B 11/18 | (2006.01) |
| H01B 1/02 | (2006.01) |
| B32B 15/02 | (2006.01) |
| C23C 18/16 | (2006.01) |
| C23C 28/02 | (2006.01) |
| C25D 3/38 | (2006.01) |

(Continued)

(52) U.S. Cl.
CPC ............ *C23C 28/023* (2013.01); *B32B 15/02* (2013.01); *C23C 18/1653* (2013.01); *C23C 18/31* (2013.01); *C23C 28/025* (2013.01); *C25D 3/38* (2013.01); *C25D 5/10* (2013.01); *C25D 7/0607* (2013.01); *H01B 1/02* (2013.01); *H01B 5/02* (2013.01)

(58) Field of Classification Search
None
See application file for complete search history.

(56) References Cited

U.S. PATENT DOCUMENTS

| 3,800,405 A | * | 4/1974 | Ziemek | ............... | B23K 20/001 |
| | | | | | 228/126 |
| 5,223,349 A | * | 6/1993 | Kudo | ................... | B21C 37/042 |
| | | | | | 428/652 |

(Continued)

*Primary Examiner* — Katie L. Hammer
(74) *Attorney, Agent, or Firm* — Oliff PLC

(57) ABSTRACT

A copper-clad aluminum composite wire that can reduce an amount of copper to be used. A structure of the copper-clad aluminum composite wire includes: a wire made of an aluminum material, where a surface of the wire made of an aluminum material is sequentially provided with an intermediate metal layer and a copper layer; and assuming that a thickness of the copper layer is $t_1$, a density of the copper layer is $\rho_1$, a thickness of the intermediate metal layer is $t_2$, a density of the intermediate metal layer is $\rho_2$, a radius of the wire made of an aluminum material is R, and a density of the wire made of an aluminum material is $\rho_3$, $$t_1 = \sqrt{(R+t_2)^2 + \frac{K_1 \times (t_2^2 + 2t_2 \times R) \rho_2 + K_1 \times R^2 \rho_3}{(1-K_1) \times \rho_1}} - R - t_2,$$

where $0.02 \le K_1 \le 0.12$. The copper-clad aluminum composite wire can be widely applied to the communication industry.

8 Claims, 1 Drawing Sheet

(51) Int. Cl.
*C25D 5/10* (2006.01)
*C25D 7/06* (2006.01)
*C23C 18/31* (2006.01)
*H01B 5/02* (2006.01)

(56) References Cited

U.S. PATENT DOCUMENTS

| | | | | |
|---|---|---|---|---|
| 6,178,623 | B1* | 1/2001 | Kitazawa | C25D 5/10 156/47 |
| 2007/0000127 | A1* | 1/2007 | Bruzek | B21C 37/042 29/868 |
| 2009/0297883 | A1* | 12/2009 | Koppensteiner | B21C 37/042 428/675 |
| 2010/0294537 | A1* | 11/2010 | Hellemans | B21C 33/004 174/126.2 |
| 2011/0162763 | A1* | 7/2011 | Calliham, Jr. | B23K 11/002 148/535 |
| 2013/0071686 | A1* | 3/2013 | Oda | B32B 15/017 428/652 |
| 2013/0233586 | A1* | 9/2013 | Park | H01B 13/0036 174/110 R |

* cited by examiner

COPPER-CLAD ALUMINUM COMPOSITE WIRE

BACKGROUND

Technical Field

The present invention relates to composite wires used in the communication industry, and in particular, to a copper-clad aluminum composite wire.

Related Art

Currently, a traditional copper-clad aluminum composite wire is obtained after an aluminum wire or an aluminum-magnesium alloy wire that serves as a core wire is directly clad with a copper strip, a seam of the copper strip is welded by means of argon shielded arc welding, and then multi-pass drawing is performed. It is widely known that mechanical performance of copper and aluminum is greatly different, although multi-pass drawing with over 80% reduction in area is performed, a copper strip and a core wire cannot be merged tightly in metallurgy. Moreover, to ensure smooth multi-pass drawing, a copper strip needs to be thick enough, and generally, a mass percentage, occupied by copper, of the composite wire is usually above 25%, which increases an amount of copper to be used, thereby increasing production costs and reducing product competitiveness.

SUMMARY

A technical problem to be resolved in the present invention is to provide a copper-clad aluminum composite wire that can reduce an amount of copper to be used and enable copper and a wire made of an aluminum material to be merged tightly, and that is used for a conductor in a feeder coaxial cable.

To resolve the foregoing technical problem, a technical solution used in the present invention is a copper-clad aluminum composite wire, including: a wire made of an aluminum material, where a surface of the wire made of an aluminum material is sequentially provided with an intermediate metal layer and a copper layer;

assuming that a thickness of the copper layer is $t_1$, a density of the copper layer is $\rho_1$, a thickness of the intermediate metal layer is $t_2$, a density of the intermediate metal layer is $\rho_2$, a radius of the wire made of an aluminum material is R, and a density of the wire made of an aluminum material is $\rho_3$, $$t_1 = \sqrt{(R+t_2)^2 + \frac{K_1 \times (t_2^2 + 2t_2 \times R)\rho_2 + K_1 \times R^2 \rho_3}{(1-K_1) \times \rho_1}} - R - t_2, \quad 0.02 \leq K_1 \leq 0.12,$$

where a unit of density is gram/cubic centimeter, and units of thickness and radius are millimeter.

As a preferred solution, in the copper-clad aluminum composite wire, the intermediate metal layer is a zinc layer or a nickel layer; and $$t_2 = R \times \sqrt{1 + \frac{K_2 \times \rho_3}{(1-K_2) \times \rho_2}} - R, \quad K_2 \leq 0.005.$$

As a preferred solution, in the copper-clad aluminum composite wire, the wire made of an aluminum material is an aluminum wire, and a mass percentage of aluminum is over 99%, that is, purity of aluminum is over 99%, and as a further preferred solution, purity of aluminum is over 99.8%.

As a preferred solution, in the copper-clad aluminum composite wire, a mass percentage of copper in the copper layer is over 99%, that is, purity of copper is over 99%, and as a further preferred solution, purity of copper is over 99.9%.

As a preferred solution, in the copper-clad aluminum composite wire, both the copper layer and the intermediate metal layer are sequentially covered on the surface of the wire made of an aluminum material by means of a method of electroplating.

As a preferred solution, in the copper-clad aluminum composite wire, the intermediate metal layer is first covered on the surface of the wire made of an aluminum material by means of a method of electroless plating, and the copper layer is then covered on a surface of the intermediate metal layer by means of electroplating.

Beneficial effects of the present invention are: in the present invention, a copper layer is provided on a wire made of an aluminum material by using an intermediate metal layer, so that the copper layer can be clad on the wire made of an aluminum material very tightly, and tight merging in metallurgy is achieved; moreover, because a mass percentage (occupying the whole wire) of copper is controlled to be below 12%, an amount of copper to be used is greatly reduced and product production costs are reduced; and in addition, an electrical parameter of the copper-clad aluminum composite wire completely meets a standard requirement.

Figure 1:
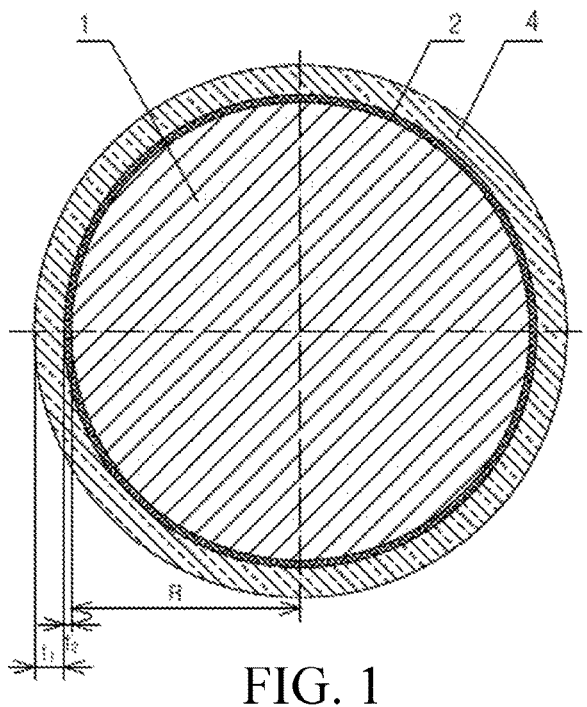
FIG. 1 is a schematic structural diagram of an implementation manner of a copper-clad aluminum composite wire according to the present invention.
Figure 2:
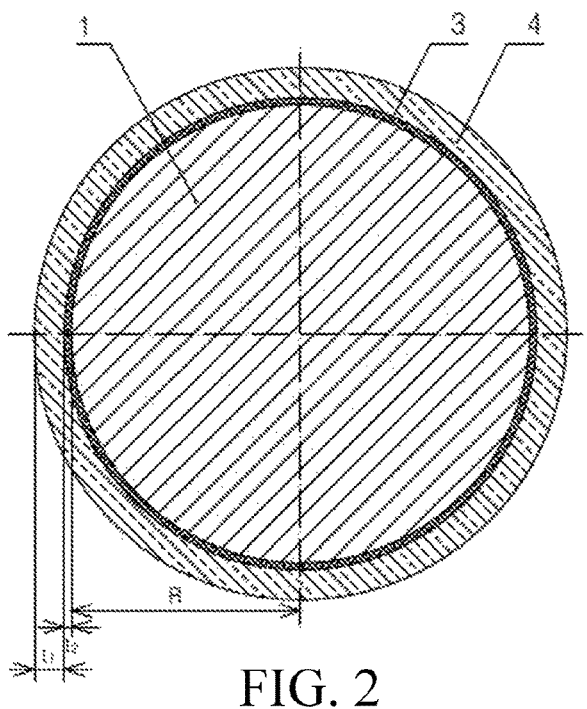
FIG. 2 is a schematic structural diagram of another implementation manner of a copper-clad aluminum composite wire according to the present invention.

Reference numerals in FIG. 1 and FIG. 2 are as follows: 1. Aluminum wire, 2. Zinc layer, 3. Nickel layer, 4. Copper layer, R is a radius of a cross-section of an aluminum wire, $t_2$ is a thickness of a zinc layer or a nickel layer, and $t_1$ is a thickness of a copper layer.

DETAILED DESCRIPTION

The following describes in detail a specific implementation solution a copper-clad aluminum composite wire of the present invention with reference to the accompanying drawings:

As shown in FIG. 1, a structure of the copper-clad aluminum composite wire of the present invention is as follows: an aluminum wire 1 is used as a wire made of an aluminum material, where a mass percentage of aluminum is over 99%, that is, purity of aluminum is over 99%, and then, a zinc layer 2 and a copper layer 4 are sequentially electroplated on a surface of the aluminum wire 1, where a mass percentage of copper of the copper layer 4 is over 99%, that is, purity of copper is over 99%; and assuming that a thickness of the copper layer 4 is $t_1$, a density of the copper layer 4 is $\rho_1$, a thickness of the zinc layer 2 is $t_2$, a density of the zinc layer 2 is $\rho_2$, a radius of the aluminum wire 1, that is, a radius of a cross-section of the aluminum wire 1 is R, and a density of the aluminum wire 1 is $\rho_3$, $$t_2 = R \times \sqrt{1 + \frac{K_2 \times \rho_3}{(1-K_2) \times \rho_2}} - R, K_2 \leq 0.005\text{:; and}$$

$$t_1 = \sqrt{(R+t_2)^2 + \frac{K_1 \times (t_2^2 + 2t_2 \times R)\, \rho_2 + K_1 \times R^2 \rho_3}{(1-K_1) \times \rho_1}} - R - t_2,$$

$$0.02 \leq K_1 \leq 0.12,$$

where a unit of density is gram/cubic centimeter, and units of thickness and radius are millimeter.

During actual application, a mass percentage of aluminum in the aluminum wire 1 is usually over 99.8%, and a mass percentage of copper in the copper layer 4 is usually over 99.9%.

As another implementation manner of the present invention, as shown in FIG. 2, nickel may also be first electroplated on the surface of the aluminum wire 1, to form a nickel layer 3 (an intermediate metal layer), and then, copper is electroplated on a surface of the nickel layer 3, to form the copper layer 4. A manner of calculating a thickness of the nickel layer 3 and the copper layer 4 is completely consistent with a manner of calculating that of the corresponding zinc layer 2 and copper layer 4 in the copper-clad aluminum composite wire shown in FIG. 1, and details are not described herein again.

Certainly, in the present invention, zinc or nickel may also be first plated on the surface of the aluminum wire 1 by means of electroless plating, to form the zinc layer 2 or the nickel layer 3 (an intermediate metal layer), and then, copper is plated on a surface of the zinc layer 2 or the nickel layer 3 by means of electroplating, to form the copper layer 4, so as to obtain the copper-clad aluminum composite wire of the present invention.

An electrical parameter of the copper-clad aluminum composite wire of the present invention completely meets a standard requirement, and major electrical parameters are shown in the following table:

| Tested item | Test frequency band according to a standard requirement (MHz) | Actual test value |
|---|---|---|
| Attenuation (dB/100 m) | 900 | ≤7.70 | 6.66 |
| | 1800 | ≤11.23 | 9.78 |
| | 1900 | ≤11.23 | 10.06 |
| | 2000 | ≤11.90 | 10.35 |
| | 2400 | ≤13.17 | 11.51 |
| Characteristic impedance (Ω) | 50 ± 2 | 50.3 |
| Capacitance (PF/m) | 76 | 71.4 |

In conclusion, only preferred embodiments of the present invention are provided, and are not intended to limit the scope of implementation of the present invention. Any equivalent change and embellishment made according to the shape, structure, characteristic, and spirit based on the scope of the claims of the present invention shall be included in the scope of the claims of the present invention.

What is claimed is:

1. A copper-clad aluminum composite wire, consisting of: a wire made of an aluminum material, wherein a surface of the wire made of an aluminum material is sequentially provided with an intermediate metal layer and a copper layer; and assuming that a thickness of the copper layer is $t_1$, a density of the copper layer is $\rho_1$, a thickness of the intermediate metal layer is $t_2$, a density of the intermediate metal layer is $\rho_2$, a radius of the wire made of an aluminum material is R, and a density of the wire made of an aluminum material is $\rho_3$, $$t_1 = \sqrt{(R+t_2)^2 + \frac{K_1(t_2^2 + 2t_2 \times R)\, \rho_2 + K_1 \times R^2 \rho_3}{(1-K_1) \times \rho_1}} - R - t_2, 0.02 \leq K_1 \leq 0.12,$$

wherein a unit of density is gram/cubic centimeter, and units of thickness and radius are millimeter.

2. The copper-clad aluminum composite wire according to claim 1, wherein the intermediate metal layer is a zinc layer or a nickel layer; and $$t_2 = R \times \sqrt{1 + \frac{K_2 \times \rho_3}{(1-K) \times \rho_2}} - R, K_2 \leq 0.005.$$

3. The copper-clad aluminum composite wire according to claim 1, wherein the wire made of an aluminum material is an aluminum wire, and a mass percentage of aluminum is over 99%.

4. The copper-clad aluminum composite wire according to claim 3, wherein a mass percentage of aluminum is over 99.8%.

5. The copper-clad aluminum composite wire according to claim 1, wherein a mass percentage of copper in the copper layer is over 99%.

6. The copper-clad aluminum composite wire according to claim 5, wherein a mass percentage of copper is over 99.9%.

7. The copper-clad aluminum composite wire according to claim 1, wherein both the copper layer and the intermediate metal layer are sequentially covered on the surface of the wire made of an aluminum material by means of a method of electroplating.

8. The copper-clad aluminum composite wire according to claim 1, wherein the intermediate metal layer is first covered on the surface of the wire made of an aluminum material by means of a method of electroless plating, and the copper layer is then covered on a surface of the intermediate metal layer by means of electroplating.

* * * * *